(12) United States Patent
Jackson

(10) Patent No.: US 6,313,922 B1
(45) Date of Patent: Nov. 6, 2001

(54) EFFICIENT USE OF A PRINTHEAD AND A COMPRESSED SWATH BUFFER IN AN INKJET PRINTER

(75) Inventor: Lee W. Jackson, Vancouver, WA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/118,142

(22) Filed: Jul. 16, 1998

(51) Int. Cl.⁷ .............. B41B 15/00; B41J 15/00; B41J 29/38; G06F 15/00

(52) U.S. Cl. .............. 358/1.16; 358/1.2; 358/1.7; 358/1.3; 358/1.4; 358/1.9; 347/9; 347/12

(58) Field of Search .............. 358/1.9, 1.2, 1.3, 358/1.4, 1.5, 1.7, 1.16, 433, 432, 1.17, 1.15, 1.14; 347/9, 12; 400/61, 70, 76

(56) References Cited

U.S. PATENT DOCUMENTS 5,490,237 * 2/1996 Zimmerman et al. .............. 358/1.16
5,610,634 * 3/1997 Murata et al. .............. 347/5
5,970,221 * 10/1999 Bolash et al. .............. 358/1.16

* cited by examiner

Primary Examiner—Edward Coles
Assistant Examiner—Twyler Lamb

(57) ABSTRACT

A method and structure are provided which allow a print pass to be initiated even if a swath buffer in a multi-pass printer has not stored enough print data to utilize the full printhead. In one embodiment, if the swath buffer is full, a print pass is initiated using the existing print data in the swath buffer, which may result in using less than the full printhead. By allowing a print pass to start when the swath buffer is full, problems such as inconsistent, delayed, or interrupted printing are minimized or eliminated. In another embodiment, if a certain period of time has passed since a previous print pass, a print pass is initiated using existing print data in the swath buffer to print new rows and to print over previously printed partial rows to minimize hue shifts.

8 Claims, 5 Drawing Sheets

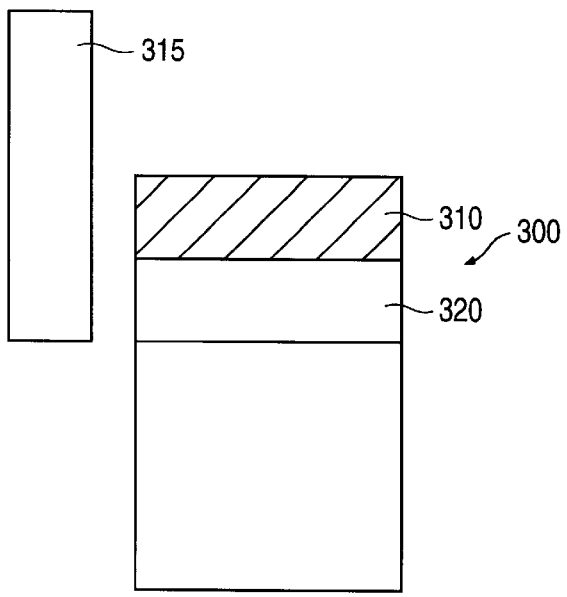
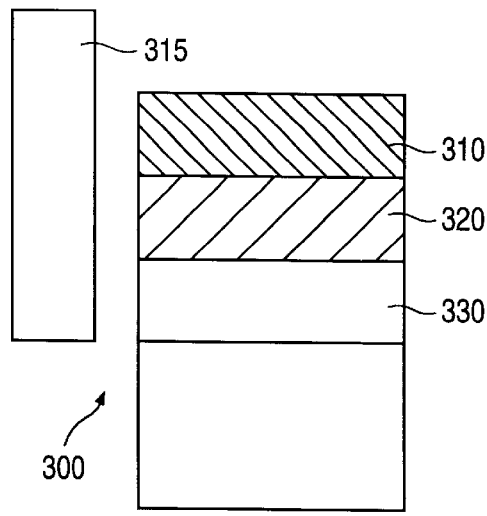
FIG. 3A  FIG. 3B
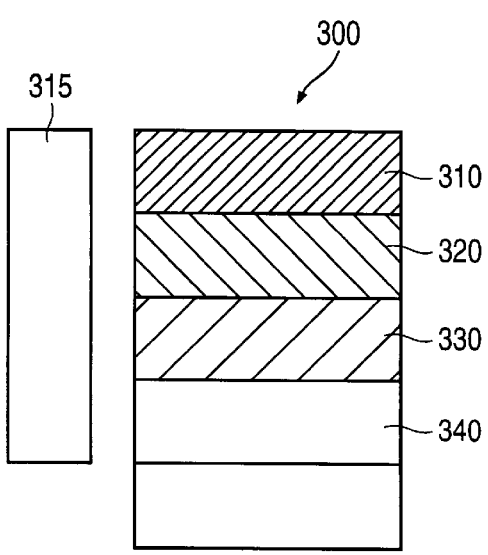
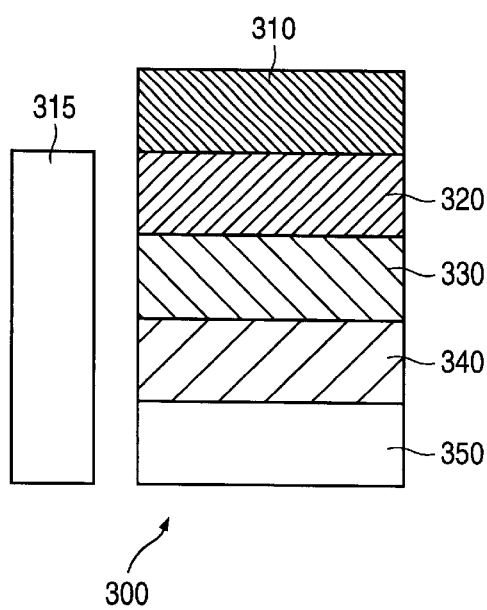
FIG. 3C  FIG. 3D

EFFICIENT USE OF A PRINTHEAD AND A COMPRESSED SWATH BUFFER IN AN INKJET PRINTER

FIELD OF THE INVENTION

This invention relates to ink jet printers, and more particular, to the use of an inkjet printhead during multi-scan printing operations.

BACKGROUND OF THE INVENTION

To print images on a print medium such as a sheet of paper, many types of inkjet printers use a printhead to eject droplets of ink on the paper as the printhead scans across the page in a raster scan format. After the printhead has scanned the page to print a swath or band of image data, the paper is incrementally advanced in a direction perpendicular to the scanning direction for the next scan. The ink is ejected through nozzles in the printhead to form dots or pixels on the page, where each swath is the height the array of nozzles on the printhead. If the nozzles, and therefore, the dots are sufficiently small and closely spaced, the resulting pattern of dots appears visually as a continuous image. Contiguous horizontal swaths, formed by raster scanning, thus compose the printed image on the page.

Color inkjet printers use four pens, where each pen ejects one ink color through a set of nozzles. The four ink colors are black, cyan (C), yellow (Y), and magenta (M). CYM comprise the three subtractive primary colors with which all other colors can be obtained. Each set of nozzles can be located on separate printheads or on a single printhead on a print carriage. By ejecting various color combinations and patterns of ink drops during a printhead scan, a desired image and/or color can be reproduced on the paper.

The data for printing a particular swath or band is stored in a memory, such as a swath buffer, in horizontal raster form. The swath buffer holds the print data until the printhead is ready for printing the swath. Typically, the swath buffer has the capacity to hold enough data to print a full color swath using the entire height of the printhead. However, once a swath is printed, the printer is idle until print data for the next swath can be stored into the swath buffer, which reduces printer efficiency and throughput. Consequently, the size of the swath buffer is often doubled for double buffering so that print data can be stored for two full printhead swaths. This allows one swath to be printed while data for the next swath is buffered. As a result, printing for a swath can begin as soon as the previous swath has been printed. As print resolution and/or printhead size increases, the amount of memory for the swath buffer increases, thereby necessitating larger and more expensive memories.

One technique to increase print quality and reduce swath memory requirements is to use multi-pass printing with data compression. In multi-pass printing, a swath is printed using multiple print passes or scans, where each print pass uses the full printhead for high quality printing. The paper is advanced a corresponding fraction of the full printhead height after each print pass. For example, if F is the amount of paper advance when a full swath is printed in a single print pass and multi-pass printing is used where one print pass utilizes the full height of the printhead and N−1 additional print passes are used to fully print the new swath, the paper is advanced F/N amount after each print pass. Typically, F is the height of the nozzle array on the printhead, which can be, for example, in inches or number of nozzle rows.

If an amount S of stored print data is required for one print pass and N print passes are used to print a full swath, each additional print pass uses S/N amount of stored data. Once this amount is freed from the swath buffer, S/N amount of new print data can be buffered in. Thus, making two print passes requires an amount S+S/N of stored data. Each additional print pass requires S/N additional print data. Because the swath buffer releases S/N amount of print data after each print pass, the size of a swath buffer required to support double buffering can be reduced from 2S to S(1+1/N) using multi-pass printing. The swath buffer memory capacity can be further reduced by compressing the print data before storage into the swath buffer using conventional data compression techniques such as run-length encoding.

By first compressing the print data, a compressed swath buffer typically requires much less memory than an uncompressed swath buffer to utilize the full height of the printhead for printing most pages. Other pages with complex images may require almost as much or more memory than an uncompressed swath buffer to utilize the full height of the printhead. However, such pages would generally print slowly even with a much larger uncompressed buffer because printing these types of pages is normally limited by host and printer processing constraints. Therefore, it is generally advantageous to reduce the swath buffer size with data compression if an efficient mechanism for dynamically varying the amount of printhead used is available because of the minimal adverse effects on system throughput.

Once a sufficient amount of compressed print data is entered into the swath buffer for a print pass, a swath manager is notified, which then makes the desired print data available and initializes the printhead for a print pass. A print pass is then made, which frees up additional memory in the swath buffer in the amount needed to store the "just-used" print data. New print data can then be buffered into the swath buffer. Print passes thus continue with a portion of the swath buffer emptying out and new print data being stored after each print pass. The printer can typically begin printing the print passes very quickly after the print data is ready. However, the swath buffer may become filled before all the necessary print data can be stored. This condition can arise, for example, when data compression is unable to efficiently compress the data. If no print passes are pending or in progress, no additional memory space can be made available to store sufficient print data for the subsequent print pass. As a result, the quality and/or speed of the printing may be drastically reduced, or the printer may simply be unable to continue printing.

In the case where the swath buffer is filled before F rows of print data have been stored to generate a print pass, printing may be slowed down, inconsistent, or halted. FIGS. 1A–1C illustrate the situation when four print passes (N=4) use a 100 nozzle printhead (F=100) to completely print a partial swath. In FIG. 1A, 125 rows of print data have been stored in a swath buffer 100. In FIG. 1B, after a first print pass, 25 rows of print data have been transferred out, but only 10 new rows of print data have been buffered in, possibly due to inefficient data compression of complex images. As a result, the swath buffer 100 is now filled, but with only 110 rows of print data. After a second print pass, shown in FIG. 1C, 25 rows of print data have been transferred out, but again, only 10 new rows of print data have been buffered in, resulting in a swath buffer filled with only 95 rows of print data. Because the printhead is 100 rows in height, insufficient data exists in the swath buffer to utilize the full printhead height, which may result in the next print pass being slow, inconsistent, or halted.

Another undesirable situation associated with conventional swath buffers arises when the printhead is ready for printing, but the necessary print data for the next print pass has not been buffered into the swath buffer. Such a situation may arise when a swath manager is slowed down so that print data may enter the swath buffer slowly, inconsistently, or not at all. So, if sufficient print data is not available to the printhead, the printhead must remain idle until there is enough information for the next print pass, thereby reducing printer throughput and efficiency.

Furthermore, when multi-pass printing is used, print quality can decrease as a result of these delays. When a series of print passes is made to deposit overlapping primary colors (CYM) to print a particular secondary color, the actual color resulting on the paper can vary depending on the time delay between a first print pass and a second print pass. This variance is due in large part to the ink drops of the first print pass drying in different degrees before the ink drops of the second print pass are deposited.

For example, assume a large area of blue is to be printed. In a first print pass, the printhead deposits cyan ink, and in a second pass, the printhead deposits magenta ink over the cyan ink. A certain hue of blue will result, the hue depending on the amount of time between the first and second print passes. On a subsequent contiguous print pass, cyan ink is again deposited on the paper. However, if the printhead is ready for a next print pass to deposit magenta ink, but the swath buffer has not stored enough print data for the print pass, the printhead will remain idle until sufficient print data is available. When sufficient print data is available for a magenta ink print pass, the cyan ink drops may have dried to a much higher degree than the prior cyan ink drops. Consequently, a different hue of blue will result, thereby degrading the color quality of the printed image.

Accordingly, it is desirable to utilize the printhead and swath buffer of an inkjet printer to minimize the problems discussed above with respect to conventional inkjet printers.

SUMMARY

In accordance with the present invention, a print pass is initiated before a swath buffer has stored enough print data to utilize the full height of a printhead in certain situations to prevent undesirable consequences of conventional multi-pass printing, such as irregular printing and delay induced hue shift.

In one embodiment, a new print pass is initiated when the swath buffer is full. The number of rows a sheet of paper is advanced and the number of new rows printed is dependent upon the amount of print data stored in the swath buffer. The number of new rows is given by the lowest of the following:

1) the number of rows in a full height of the printhead divided by the number of passes used to fully print a partial swath,
2) the number of rows of print data in the swath buffer divided by the number of print passes plus one, or
3) the number of rows of print data in the swath buffer that have not yet begun printing.

The first number is constant for a given printhead and multi-pass print mode and represents conventional multi-pass printing utilizing the full height of the printhead with fractional amounts of print data. The second number is variable, depending on the amount of print data in the filled swath buffer and represents effectively altering the height of the printhead in a print pass. The third number represents the maximum number of new rows that have been buffered into the swath buffer, but have not been used yet for a print pass.

By using the available print data stored in a filled swath buffer, a print pass can be initiated using less than the full height of the printhead. Consequently, problems associated with conventional multi-pass printers when the swath buffer is full and insufficient print data exists to utilize the full printhead, such as delayed, inconsistent, or interrupted printing, are minimized or eliminated.

In another embodiment, a new print pass is initiated after a certain amount of time has passed since the last print pass, even if the stored print data in the swath buffer is insufficient to utilize the full printhead. The time before initiating a print pass can be adjusted to address specific printing requirements. For example, to eliminate hue shift, the time should be set to the maximum amount of time between print passes before a visible hue shift occurs. The number of new rows printing in a print pass can be a constant or a variable dependent upon factors such as amount of existing stored print data. In one embodiment, a new print pass is initiated after 2.5 seconds to print 10 new rows, but only if the swath buffer has stored enough print data to print 10 new rows.

By initiating a print pass to print over previous partially printed rows before hue shifts occur, delay induced hue shifts can be eliminated.

The present invention will be better understood in light of the following detailed description, taken together with the accompanying drawings.

BRIEF DESCRIPTION OF THE DRAWINGS

FIGS. 3A–3D illustrate various stages of multipass printing;

Use of the same reference numbers in different figures indicates similar or like elements.

DETAILED DESCRIPTION

According to the present invention, an inkjet printer initiates a print pass based on the condition of the swath buffer. In one embodiment, a swath manager will initiate a print pass to print available print data if the swath buffer is filled before the amount of data necessary for a full print pass is buffered. The amount of data printed during the print pass is based on the amount of print data stored in the swath buffer. In another embodiment, the swath manager will initiate a print pass to print available print data if the printhead has remained idle for a certain amount of time while waiting for a full print pass worth of data to be buffered. The amount of time before initiating a print pass is dependent on print quality concerns.

Figure 2:
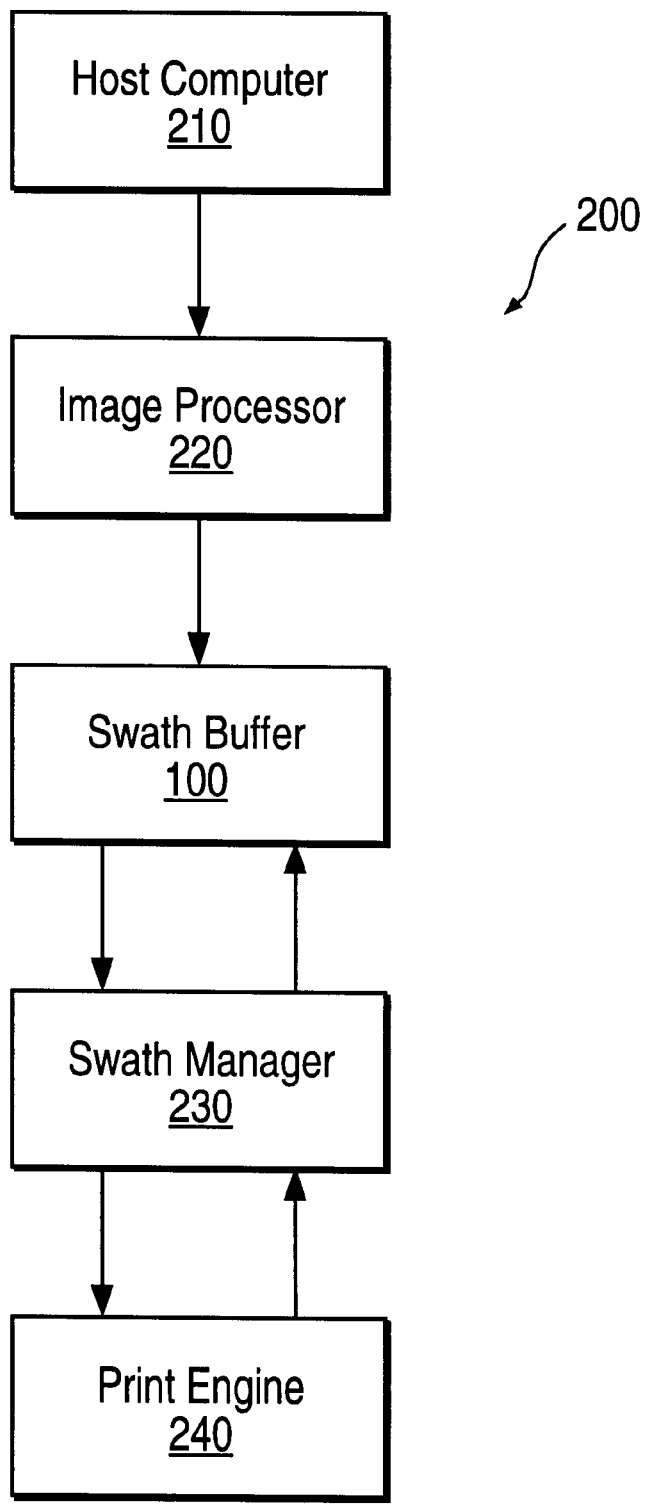
FIG. 2 is a block diagram of relevant portions of an inkjet printer system.

FIG. 2 is a simplified block diagram of relevant portions of an inkjet printer system 200. The printer system 200 typically includes a host computing device 210, such as a personal computer, having a video monitor to allow the user to interface with the device. The image displayed on the monitor is usually stored in terms of the primary additive colors red, green, and blue (RGB). An image processor 220 converts the image stored in the host computing device 210 into swaths or bands of raster print data in a cyan, yellow, magenta (CYM) color format. Data compression, such as run-length encoding, can also be performed in the image processor 220 to increase the printing capacity of the printer system 200.

The print data is then rasterized in the swath buffer 100. While new print data is being stored in the swath buffer 100, print data from a previous swath is accessed by a swath manager 230, which then enables a print pass using the accessed print data. The swath manager 230 controls a print engine 240, which includes a print carriage and a plurality of printheads. The swath manager 230 initiates a printhead scan and also determines which nozzles in the printhead are fired to eject a desired pattern of ink drops onto a printing medium, such as a sheet of paper.

As discussed previously, if the swath buffer 100 can store twice the amount of print data needed to print a complete swath using the full height of the printhead, image processor 220 could be rasterizing print data for a new swath in swath buffer 100 while print data in swath buffer 100 is being processed by swath manager 230 for use by print engine 240. Thus, after printing a swath, the printhead does not need to remain idle waiting for print data for the next swath to be rasterized. However, for double buffering, the size and cost of the swath buffer 100 can become prohibitive due to higher resolution printers.

Multi-pass printing with data compression, as discussed above, can reduce the size requirements of the swath buffer 100 and increase print quality by using lower amounts of print data for each of N print passes while still allowing the full height of the printhead to be utilized. FIGS. 3A–3D illustrate multi-pass printing with N=4 to print a one inch swath. Also, for illustration purposes, assume a one inch swath corresponds to a printhead having 100 rows of nozzles. FIG. 3A shows the result of printing after one print pass on a sheet of paper 300, resulting in a first partial swath 310 having a height of 25 (i.e., 100/4) rows or ¼". The location of a printhead 315 relative to the paper 300 is shown after the paper has been advanced 25 rows or ¼" for printing a second partial swath 320. Note that for illustration purposes, the relative amount of print data on the paper 300 is represented by varying degrees of shading, with black indicating fully printed portions and white indicating unprinted portions of the paper.

In FIG. 3B, after a second print pass, the first partial swath 310 contains print data equivalent to two print passes, and the second partial swath 320 contains print data equivalent to one print pass. Each new partial swath contains 25 rows or ¼" of newly printed data. The paper is advanced another ¼" in preparation of printing a third partial swath 330. After a third print pass, the first partial swath 310 contains print data equivalent to three print passes, the second partial swath 320 contains print data equivalent to two print passes, the third partial print swath 330 contains print data equivalent to one print pass, and the printhead 315 is positioned to print a fourth partial swath 340, as shown in FIG. 3C.

After a fourth print pass, the first partial swath 310 has completed printing, the second partial swath 320 has print data equivalent to three print passes, the third partial swath 330 has print data equivalent to two print passes, the fourth partial swath 340 has print data equivalent to one print pass, and the printhead 315 is positioned to print a fifth partial swath 350, as shown in FIG. 3D. The print passes continue, with each print pass utilizing the full 100 rows of nozzles, with each print pass releasing 25 rows of print data after each printing. The paper advances 25 rows after each print pass, so that after each new print pass, 100%, 75%, 50%, and 25% of 25 row portions are printed, until the page is fully printed. Thus, as seen from FIG. 3D, with multi-pass printing, print passes are interleaved with paper advances so that after N print passes, there are N−1 swaths which are partially printed with varying amounts of printed data and one swath which is fully printed.

In the above example, 25 rows of print data are freed from the swath buffer after each new print pass that 25 new rows of print data are able to be rasterized and stored in the newly available memory space. For a 100 nozzle printhead, the swath buffer memory can thus be reduced from storing 200 rows of print data (for double buffering) to storing 125 rows of print data (for multi-pass printing). Because each additional print pass requires only an amount S/N of print data, where S is the amount of data needed for one complete print pass, the size of the swath buffer can be reduced from 2S to S(1+1/N). In the above example, with N=4, the size of the swath buffer 100 is reduced from 2S to 1.25S, for a 5/8 reduction in size from double buffering. In FIG. 3D, after printing 25% of the fourth partial swath 340, the swath buffer has been emptied of 25 rows of print data, at which time, new print data begins buffering into the swath buffer, one row at a time until 25 rows are stored and filling the buffer back up to 125 rows of print data. In general, F/N rows are emptied from the swath buffer each print pass after the paper has advanced F/N rows and F/N new rows are printed, where F is the number of rows of nozzles in a full printhead. Therefore, each print pass utilizes the full height of the printhead, but only with S/N amount of print data. This is the amount of data released for each print pass, and also the amount of new print data required for each new print pass. S amount of print data must be available in the swath buffer, as this is the amount which will actually be accessed in printing the pass. Note that F can be measured in other units, such as inches. Accordingly, a new print pass is not initiated until the swath buffer has enough print data to utilize the full size of the printhead, i.e., F rows of stored print data.

In the present invention, a print pass can be initiated before F rows of print data have been stored. The result is that a print pass can be initiated with a paper advance of less than F/N rows to print less than F/N new rows in certain situations.

In one embodiment of the present invention, a print pass is initiated when the swath buffer is filled, regardless of whether enough print data has been buffered to print F/N new rows of data. Instead of a fixed number of new rows F/N and a fixed paper advance F/N, the number of new printed rows and amount of paper advance can be variable, dependent upon the amount of print data stored in the swath buffer when the buffer is full. By initiating a print pass when a swath buffer is filled, problems such as slow, inconsistent, or halted printing can be minimized.

Figure 4:
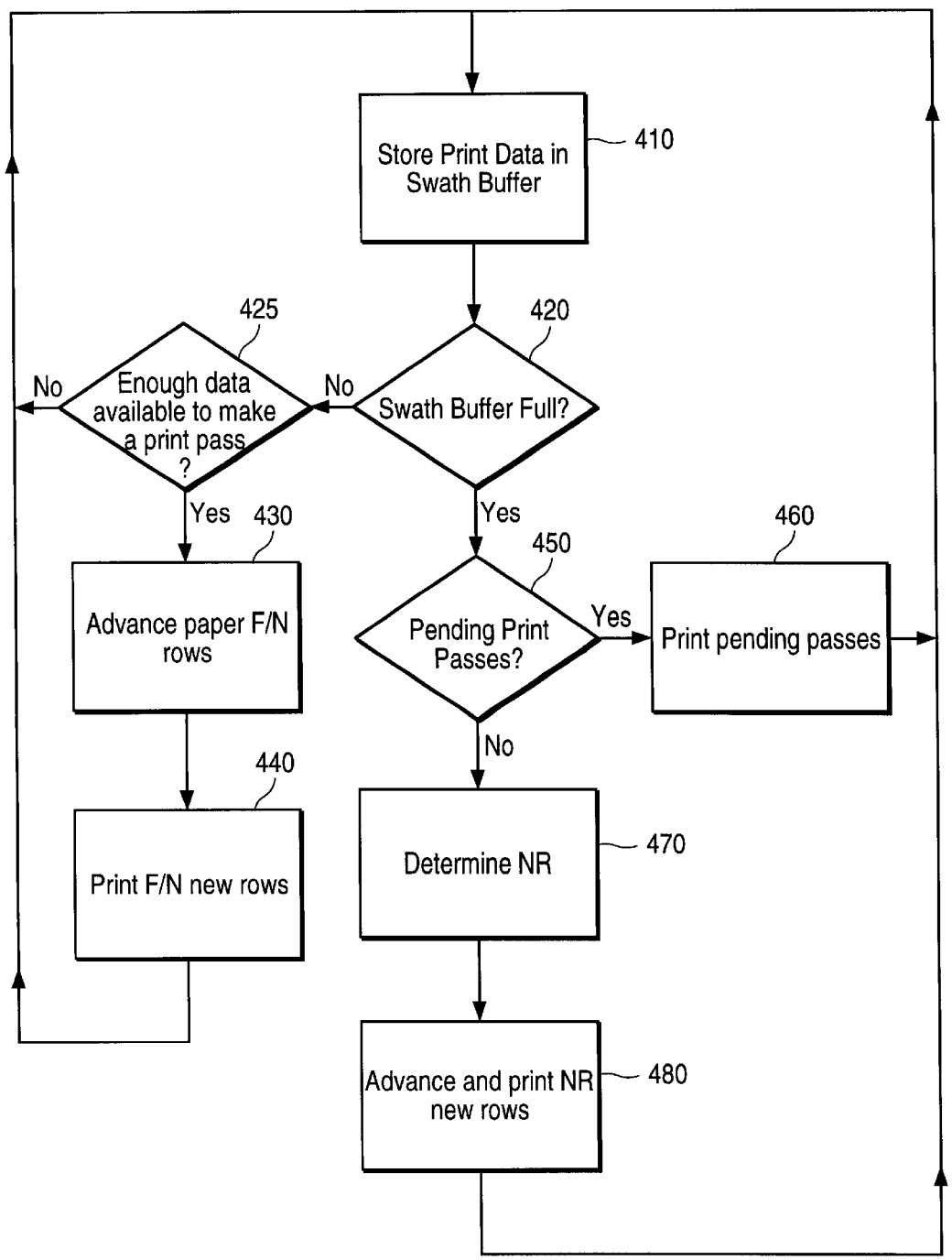
FIG. 4 is a flow chart illustrating one embodiment of the present invention.

FIG. 4 is a flow chart illustrating the embodiment. In block 410, print data is stored in the swath buffer. In block 420, the swath manager determines if the swath buffer is full. If no, then in block 425, the swath manager checks whether enough print data is available in the swath buffer to make a print pass. If there is not enough print data, new print data continues to be stored in the swath buffer in block 410. However, if sufficient print data exists, then printing continues as normal, i.e., advancing the paper F/N rows in block 430, printing F/N new rows in a print pass in block 440, and buffering additional print data in block 410. If the swath buffer is full, the swath manager checks if there are any print passes pending in swath buffer in block 450. For example, the swath manager may have already sent one or more print passes to a print queue, but a print engine may not have initiated the print passes yet. In this case, where pending print passes exist, the swath manager will wait until the pending print passes are executed in block 460, which will free up additional memory in the swath buffer and allow additional print data to be buffered in block 410. However, if no print passes are pending, the swath manager determines in block 470 the number of new rows NR to be printed on the next print pass by utilizing the following algorithm:

$$NR=\min(F/N, SR/(N+1), U),$$

where

F=the height of the printhead in rows,

N=the number of print passes to completely print a partial swath,

SR=the number of rows of print data currently stored in the swath buffer, and

U=the number of rows of print data currently stored in the swath buffer that have not begun printing.

The number U is the maximum number of new rows that can be printed in a print pass. In certain situations, SR may produce a number which is larger than U. Therefore, limiting the number of new rows to U assures that printing will continue in such situations.

The paper is advanced NR new rows, and NR new rows are printed in block 480. Printing then continues with print data being buffered in block 410. Therefore, by effectively reducing the size of the printhead, printing can continue even when the swath buffer is full and insufficient print data exists in the swath buffer to utilize the full printhead.

Figure 1A:
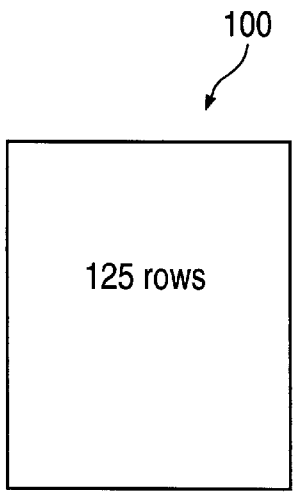
FIGS. 1A–1C show various stages of a swath buffer using conventional multi-pass printing.
Figure 1B:
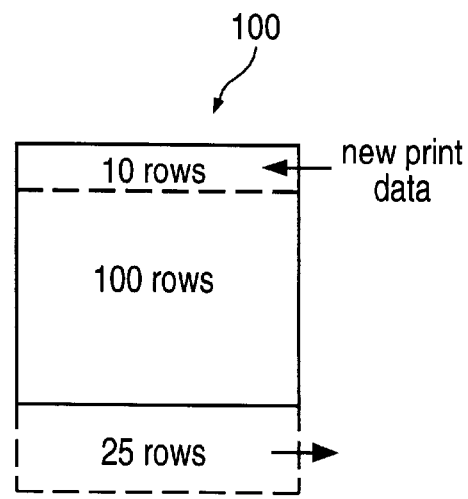
Figure 1C:
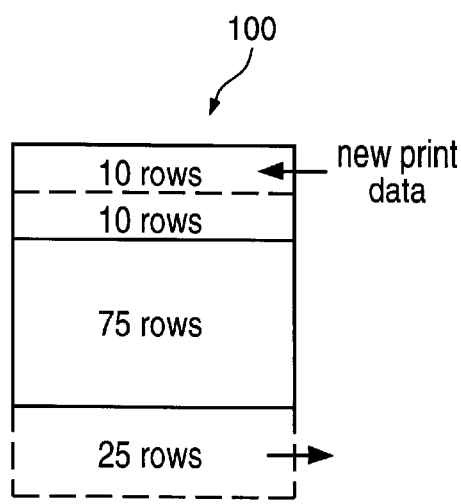

The operation of the algorithm can be illustrated using the example of FIGS. 1A–1C, assuming no pending passes exist. In FIG. 1A, the swath buffer is full with 125 rows of print data. The number of new rows NR is equal to the minimum of 100/4 and 125/5, both of which are equal to 25. Thus, the paper is advanced 25 rows and 25 new rows are printed, as expected. In FIG. 1B, the swath buffer is full with only 110 rows of print data. NR is then equal to the minimum of 100/4 and 110/5, which is 22. Thus, the paper is now only advanced 22 rows and 22 new rows are printed, which effectively reduces the printhead height from 100 rows to 97 rows. If 10 rows of print data are stored after each succeeding print pass, a steady state is eventually reached, where 50 rows of print data are stored in a filled swath buffer. In this case, NR is equal to the minimum of 25 and 50/5, which is 10. Thus, the paper is advanced 10 rows and 10 new rows are printed each print pass, thereby effectively reducing the printhead height to 40 rows. Of course, if 125 rows of print data are stored in a filled swath buffer at a later time, the printhead will again be fully utilized with 100 rows.

In another embodiment of the present invention, a print pass is initiated after a certain period of time has elapsed from a previous print pass, regardless of whether enough print data has been buffered to print F/N new rows of data. Instead of waiting until sufficient print data has been stored to advance the paper F/N rows for printing F/N new rows, a print pass is initiated sooner with a lower amount of paper advance for printing fewer new rows. By initiating a print pass after a set period of time, problems associated with waiting beyond a certain time between print passes, such as hue shifts, can be minimized.

Figure 5:
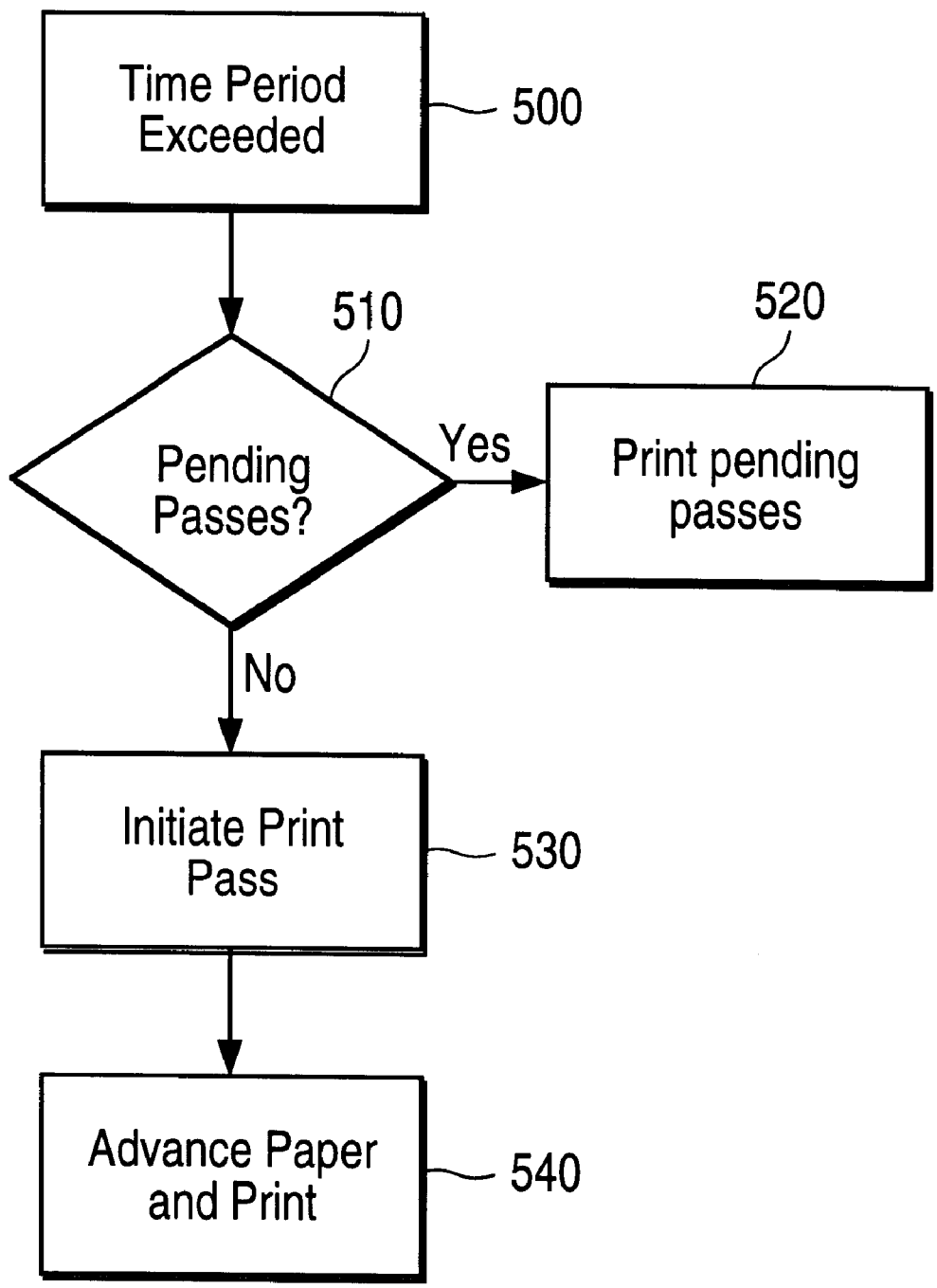
FIG. 5 is a flow chart illustrating another embodiment of the present invention.

FIG. 5 is a flow chart illustrating this embodiment. In block 500, a print mechanism manager, which can be included within print engine 240 of FIG. 2, is notified when a certain amount of time has passed since the last print pass. This amount of time can be varied depending on specific printing requirements of the print job. For example, to eliminate visible hue shifts, this time period could be set to the maximum amount of time allowed between print passes before a noticeable hue shift is perceived. Factors contributing to the amount of time delay may include nozzle size, ink characteristics, and printhead scanning speed. In the Hewlett-Packard printer, Model 2000C Professional Series Color Printer, for example, the time delay before a visible hue shift occurs is 2.5 seconds.

In block 510, the swath manager checks if any pending print passes exist. If yes, then the swath manager and print mechanism manager will not initiate a new print pass, but will wait until a pending print pass is executed in block 520. However, if no pending print passes exist, then in block 530, the print mechanism manager informs the swath manager to initiate a print pass. In block 540, the paper is thus advanced, and a new print pass commences to print new rows, as well as over any partially printed previous rows before visual hue shifts can occur. The amount of paper advance and new rows printed can be dynamic, possibly changing with each new print pass, depending on the amount of print data stored in the swath buffer at the time a print pass is initiated. Any suitable algorithm, such as the one described earlier with respect to the first embodiment, can be used for determining the amount of paper advance and number of new rows printed. Alternatively, the number of new rows can be fixed so that after the specified time has elapsed between print passes, the paper is advanced a fixed amount and a fixed amount of new rows are printed, even if the print data stored in the swath buffer allows more rows to be printed. However, if insufficient print data exists in the swath buffer to print this fixed amount of new rows, a print pass is not initiated until this amount is reached. With the HP 2000C, the paper is advanced 10 rows, and 10 new rows are printed 2.5 seconds after the previous print pass, but only if the necessary amount of data is stored in the swath buffer.

While particular embodiments of the present invention have been shown and described, it will be obvious to those skilled in the art that changes and modifications may be made without departing from this invention in its broader aspects. For example, the above description focuses on multi-pass printing, where the paper is advanced each new print pass. However, the paper does not have to be advanced each print pass to realize the benefits in accordance with this invention. The present invention can be utilized with various inkjet printers, such as those described in commonly-owned U.S. patent Ser. Nos. 5,748,216 and 5,677,716, which are hereby incorporated by reference in their entirety. Therefore, the appended claims are to encompass within their scope all such changes and modifications as fall within the true spirit and scope of this invention.

What is claimed is:

1. A method of multi-pass inkjet printing, comprising:

storing printed data;

initiating a print pass before an amount of print data sufficient to utilize the full height of a scanning printhead in a print pass has been stored; and determining the height of said printhead used during a print pass based on the amount of print data stored, wherein said height is given by P+SR/(N+1), wherein P is the number of partially printed rows, N is the number of print passes needed to completely print at least one row of print data, and SR is the amount of stored print data prior to initiating said print pass.

2. The method of claim 1, further comprising advancing a printing medium SR/(N+1) amount to print SR/(N+1) amount of new print data each print pass.

3. The method of claim 1, wherein the height of said printhead is determined after each print pass.

4. A method of multi-pass inkjet printing, comprising:

storing print data in a buffer; and initiating a print pass before an amount of print data sufficient to utilize the full height of a scanning printhead in a print pass has been stored, wherein said print pass is initiated when said buffer is full, wherein N print passes completely print at least one row of print data.

5. The method of claim 4, wherein a printing medium is advanced said at least one row of print data after each print pass.

6. A method of multi-pass inkjet printing, comprising:

storing print data in a buffer; and initiating a print pass before an amount of print data sufficient to utilize the full height of a scanning printhead in a print pass has been stored, wherein said print pass is initiated after a fixed period of time has elapsed since a previous print pass, wherein said print pass is not initiated if a minimum height of said printhead cannot be used during a print pass.

7. A multi-pass inkjet printing apparatus, comprising:

a swath buffer for storing rasterized print data;

a swath manager coupled to said swath buffer, wherein said swath manager initiates a print pass when said swath buffer is full before an amount of print data sufficient to utilize the full height of a scanning printhead in a print pass has been stored; and a print engine comprising a scanning printhead, said print engine coupled to said swath manager for receiving signals to initiate said scanning printhead for a print pass, wherein N print passes of said scanning printhead completely print at least one row of print data.

8. A multi-pass inkjet printing apparatus, comprising:

a swath buffer for storing rasterized print data;

a swath manager coupled to said swath buffer, wherein said swath manager initiates a print pass after a fixed period of time has elapsed since a previous print pass before an amount of print data sufficient to utilize the full height of a scanning printhead in a print pass has been stored; and a print engine comprising a scanning printhead, said print engine coupled to said swath manager for receiving signals to initiate said scanning printhead for a print pass, wherein said swath manager does not initiate a print pass if a minimum height of said printhead cannot be used during a print pass.

* * * * *